United States Patent [19]

Wiebe

[11] Patent Number: 5,009,521
[45] Date of Patent: Apr. 23, 1991

[54] RAILWAY TRUCK AND BEARING ADAPTER THEREFOR, AND METHOD FOR CONTROLLING RELATIVE MOTION BETWEEN TRUCK COMPONENTS

[75] Inventor: Donald Wiebe, Sewickley, Pa.

[73] Assignee: A. Stucki Company Division of Hansen, Inc., Pittsburgh, Pa.

[21] Appl. No.: 522,472

[22] Filed: May 11, 1990

Related U.S. Application Data

[63] Continuation of Ser. No. 379,934, Jul. 14, 1989, abandoned.

[51] Int. Cl.⁵ ............................................. F16C 23/04
[52] U.S. Cl. .............................. 384/191.1; 384/191.4; 105/224.1
[58] Field of Search ............... 384/191.1, 191.4, 191.2, 384/158.1; 105/224.1

[56] References Cited

U.S. PATENT DOCUMENTS

| | | |
|---|---|---|
| 149,284 | 4/1874 | Baker . |
| 301,510 | 7/1884 | Meatyard . |
| 1,222,698 | 4/1917 | Waugh . |
| 1,904,007 | 4/1933 | O'Brien . |
| 2,207,848 | 7/1940 | Barrows .......................... 105/224.1 |
| 2,239,646 | 6/1939 | Cottrell . |
| 2,828,167 | 3/1958 | Baillie ............................... 384/191.1 |
| 2,842,409 | 7/1958 | Christensen et al. . |
| 2,957,733 | 11/1960 | Hare . |
| 3,098,682 | 7/1963 | Thomas . |
| 3,206,260 | 9/1965 | Zupez et al. ..................... 384/191.1 |
| 3,211,112 | 10/1965 | Baker ................................ 105/224.1 |
| 3,222,111 | 12/1965 | Thomas ........................... 384/191.4 |
| 3,274,955 | 9/1966 | Thomas ............................. 105/224.1 |
| 3,276,395 | 6/1966 | Heintzel ........................... 105/224.1 |
| 3,381,629 | 5/1968 | Jones .................................... 105/218 |
| 3,621,792 | 11/1971 | Lich ................................... 105/224.1 |
| 3,638,582 | 2/1972 | Beebe ............................. 105/218 R |
| 3,699,897 | 10/1972 | Sherrick ......................... 105/218 R |
| 4,044,689 | 8/1977 | Eggert, Jr. ...................... 105/221 R |
| 4,655,143 | 4/1987 | List ....................................... 105/168 |

OTHER PUBLICATIONS

"Evaluation . . . of Hopper Car", A. Arslan et al, ASME, (1985).
Advertisement, American Steel Foundries, (no date).
"Train Line" publication by Dresser Industries, (1981).

*Primary Examiner*—Lenard A. Footland
*Attorney, Agent, or Firm*—Carothers & Carothers

[57] ABSTRACT

A railway truck and a bearing adapter therefor which provides improved control of relative movement between a railway truck wheelset and the truck side frames supported thereby.

27 Claims, 3 Drawing Sheets

RAILWAY TRUCK AND BEARING ADAPTER THEREFOR, AND METHOD FOR CONTROLLING RELATIVE MOTION BETWEEN TRUCK COMPONENTS

This is a continuation of co-pending application Ser. No. 07/379,934 filed on July 14, 1989 now abandoned.

BACKGROUND OF THE INVENTION

This invention concerns a railway truck and a flexible roller bearing adapter assembly which provides fit-up between a bearing journal and a side frame in a conventional three-piece railway truck such that the wheelsets can move independently with respect to the side frames as is required to achieve proper wheelset tracking on both curved and tangent track. Various benefits are realized, including reduced flange-to-rail contact and reduced sliding at the interface between the wheel and rail running surfaces.

The invention contemplates a bearing adapter assembly which includes elastomeric elements having a form or geometry that provides for three dimensional support of the side frame pedestals on the bearing journals in a manner that permits necessary and controlled bearing journal translation longitudinally of the side frames in the pedestal opening through differential deformation of the elastomer, including compression thereof. The invention further provides continuously wear-compensated longitudinal and lateral bearing adapter-to-pedestal constraint.

A conventional three piece railway truck is comprised of a pair of laterally spaced side frames which are supported on a pair of longitudinally spaced wheelsets, and an elongated bolster which extends between the spaced side frames and is supported thereon by springs. Practitioners in the art have continuously sought to improve the performance of such trucks in an effort to realize improved truck component service life, reduced rail wear, improved fuel economy and operating reliability, increased safety, and other benefits which can result in overall enhancement of railway rolling stock performance.

As usually furnished commercially, modern railway truck wheelset roller bearings permit only very limited wheelset movement with respect to the side frames. For example, such bearings permit no substantial lateral freedom for the wheelsets to move laterally with respect to the truck side frames. More specifically, it is well known that when a conical wheelset of a conventional truck is displaced laterally on the rails, the wheels roll on unequal radii. The wheel which rolls on the larger radius moves ahead of the other wheel thus steering the wheelset from the laterally displaced position toward the center position, where the wheels roll on equal radii. However, as the wheelset continues on its preferred path, it passes the equilibrium or centered position and moves to a laterally displaced position on the opposite side of center, from which the effect of the wheels rolling on unequal radii again steers the wheelset back toward the centered position. The wheelset thus continuously rolls along a substantially sinusoidal path when there is no sliding at the rail-wheel interface. In order to follow such a sinusoidal path the wheelsets move with respect to the side frames to either a trapezoidal geometry as in radial steering, or a parallelogram geometry such as commonly occurs when the truck warps.

Due to the lack of lateral freedom in the roller bearings, the entire truck will tend to follow such a sinusoidal path. At higher speeds the motion of an empty car body will tend to couple with lateral truck oscillations to produce violent cyclical lateral car body accelerations, commonly known as hunting, which can result in accelerated wear of rail car components and rails as well as other undesirable consequences including lading damage.

Conventional prior art trucks also permit the wheelset bearing journals only very limited longitudinal and rotational freedom in the horizontal plane with respect to the side frame pedestals due to bearing adapter-to-side frame horizontal friction and restricted motion limits. As a result, the wheelsets of prior art trucks have insufficient longitudinal freedom at the side frame pedestals to steer to a radial alignment when traversing curved track. Consequently, the wheelsets tend to slide on the rails when negotiating curved track. The inability of the wheelsets of such trucks to steer thus results in severe frictional rubbing contact between the wheel flanges and the rails, and accelerated flange and rail head wear on shorter radius curves. Under such conditions, fuel economy also suffers as a great deal of energy is dissipated by such rubbing contact. More severe flange rubbing also may create a tendency for the wheel to climb the rail thus precipitating a derailment. Furthermore, improper wheelset tracking on curves may also cause or aggravate track misalignment.

The variable restraining friction and unpredictable motion limits between the bearing journal adapter and the side frame pedestal in conventional trucks also results in tracking energy losses on tangent track. When the wheelsets of a truck cannot achieve a free rolling alignment on tangent track due to asymmetrical tread wear and/or journal-to-pedestal restraint, the resulting wheel tread slip and/or flange rubbing causes increased wheelset rolling energy dissipation.

The art has contemplated trucks which include resilient wheelset journal suspension to provide greater freedom of relative motion than in trucks such as those characterized above. For example, steering trucks are known which use articulating techniques such as mechanical linkage systems, usually in the form of steering arms, for the simultaneous control of both wheelsets in the truck. Nearly all such articulated steering trucks and other known truck designs require resilient journal suspension at the side frame pedestals. However, to be effective the resilient suspension must be sufficiently elastic in horizontal shear to permit the bearing journal to move longitudinally in the pedestal for steering, and must also be sufficiently stiff in the lateral direction so as not to reduce the composite lateral car body-to-truck spring constant and thereby encourage low speed empty car hunting. As a result of these conflicting requirements, known resilient journal suspensions often have yielded either unsatisfactory control at lower empty car speeds or a limited or ineffective steering capability. For example, many prior resilient journal suspensions, commonly the "sandwich" configurations in which elastomer is sandwiched or laminated in alternate layers with a rigid substrate such as a steel plate, the available lateral and longitudinal restraint are identical and therefore unable to accommodate such conflicting requirements as those specified above.

The prior art has also contemplated the use of resilient elastomers in conjunction with the bearing adapters of railway truck wheelsets for load cushioning or shock absorption. Some such prior art pertains to trucks with so-called plane bearings. Patents of interest include U.S. Pat. Nos. 149,284, 301,510, 1,222,698, 1,904,007, 2,234,413, 2,239,646, 2,842,409, 2,957,733, 3,033,617, 3,098,682, 3,222,111, 4,044,689, and 2,207,848. The above cited patents are not generally concerned with journal-to-side frame flexibility for the purpose of wheelset steering.

BRIEF SUMMARY OF THE INVENTION

The present invention contemplates a novel and improved railway truck and bearing adapter apparatus and method for accommodating and controlling relative motion between the side frames and the wheelsets of a conventional three piece railway truck. The invention provides effective wheelset steering freedom under loaded car conditions as well as lateral stability for empty cars at higher speeds.

The apparatus of this invention includes a journal bearing adapter assembly having resilient elastomeric elements which are confined between the bearing adapter and the roof of a side frame pedestal opening. The elastomeric elements, owing to their particular geometry which may be regarded generally as a wedge shape in a presently preferred embodiment of the invention, are initially vertically deformed in compression between a rigid bearing adapter member and the roof of the side frame pedestal opening under the side frame weight and the weight carried thereby. The initial or preload elastomeric deformation provides mutual restraint, both laterally and longitudinally, between the bearing journal adapter and the side frame pedestal jaw thrust lugs, with sufficient lateral and longitudinal stiffness for confinement of the bearing journals with respect to the respective pedestal openings.

At the same time the elastic deformation of the elastomeric elements permits sufficient longitudinal freedom between the wheelsets and the side frame pedestals that wheel/rail friction can move the wheelsets to a radial position for slip-free tracking. However, sufficient motion restraint is also available to discourage lower speed empty car hunting. Most importantly, under larger magnitude loading, which increases wheel/rail frictional forces, the wheelsets can yaw independently of the side frames. Accordingly, they can follow both tangent and curved track without undue flange-rail contact or higher magnitude rail-wheel slip or creepage at the running surface of the rail.

The invention also provides continuous compensation capability to keep the bearing adapter-to-side frame fit-up free of excess lateral and longitudinal freedom which would otherwise develop as a result of progressive wear during the service life of the bearing adapter. The invention additionally provides for reduced wear rates in such wearing components as the pedestal roof and the bearing adapter assembly as well as reduced potential for bearing damage resulting from impact loads between the pedestal jaw thrust lugs and the bearing cup such as may result from train action forces due to acceleration or braking or hump yard operations.

Accordingly, it is one object of this invention to provide a novel and improved method and apparatus for supporting a side frame of a railway truck with respect to a wheelset journal bearing.

A more specific object of the invention is to provide a novel and improved railway truck bearing adapter including elastomeric elements which provide optimum restraint of wheelset-to-side frame relative motion for both empty and loaded car operating conditions.

Another object of the invention is to provide a novel and improved method of maintaining engagement and controlling relative motion between the wheelsets and side frames of a railway truck.

A more specific object of both the apparatus and method aspects of the invention is to provide a railway truck bearing adapter assembly with one or more resilient elastomeric elements that are continuously maintained in a confined and deformed relationship with respect to the wheelset and side frame, the elastomeric elements including portions thereof which are deformed by relative steering and truck warping motion between the wheelset and side frame and which tend to resile from the deformed state thus providing restraint of such relative motion.

These and other objects and further advantages of the invention will be more readily understood upon consideration of the following detailed description and the accompanying drawings, in which.

Figure 1:
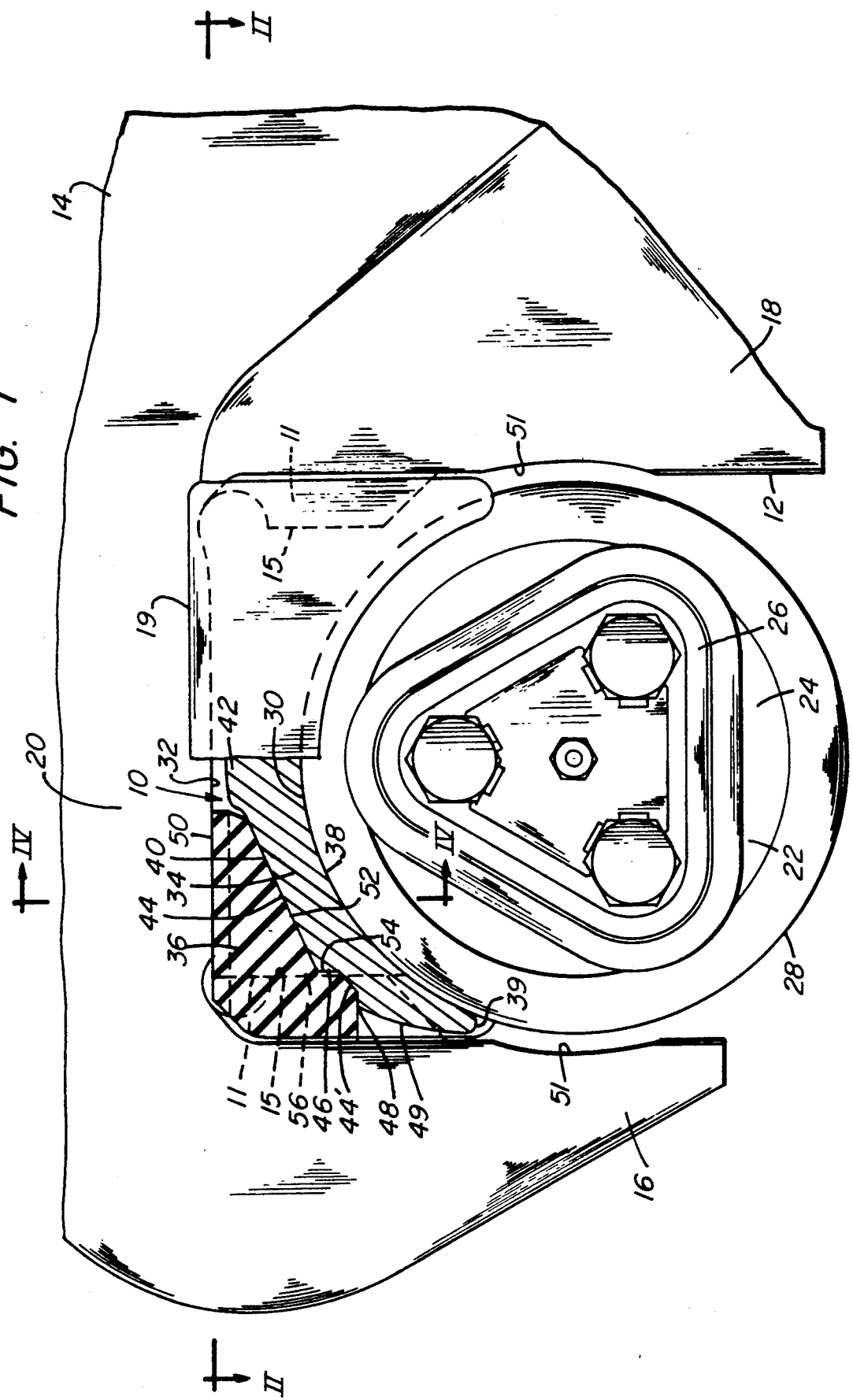
FIG. 1 is a side elevation, partially sectioned on line I—I of FIG. 2, of a fragmentary portion of a railway truck side frame assembled with a wheelset bearing journal and a bearing adapter assembly according to one presently preferred embodiment of the instant invention.

There is generally indicated at 10 in FIG. 1 a bearing adapter assembly which is received within a pedestal opening 12 of a railway truck side frame 14. Only a fragmentary end portion of side frame 14 is shown. The railway truck generally may be a conventional structure consisting of a pair of laterally spaced side frames 14 each having pedestal openings 12 adjacent the opposed longitudinal ends thereof, and each supporting intermediate the longitudinal ends thereof one respective end of an elongated bolster (not shown) which extends intermediate the spaced side frames 14. For purposes of this description, the term lateral will refer to the direction of lateral spacing between the side frames of a truck (i.e. axially of the wheelsets) and the term longitudinal will refer to the direction longitudinally of the side frames.

Figure 2:
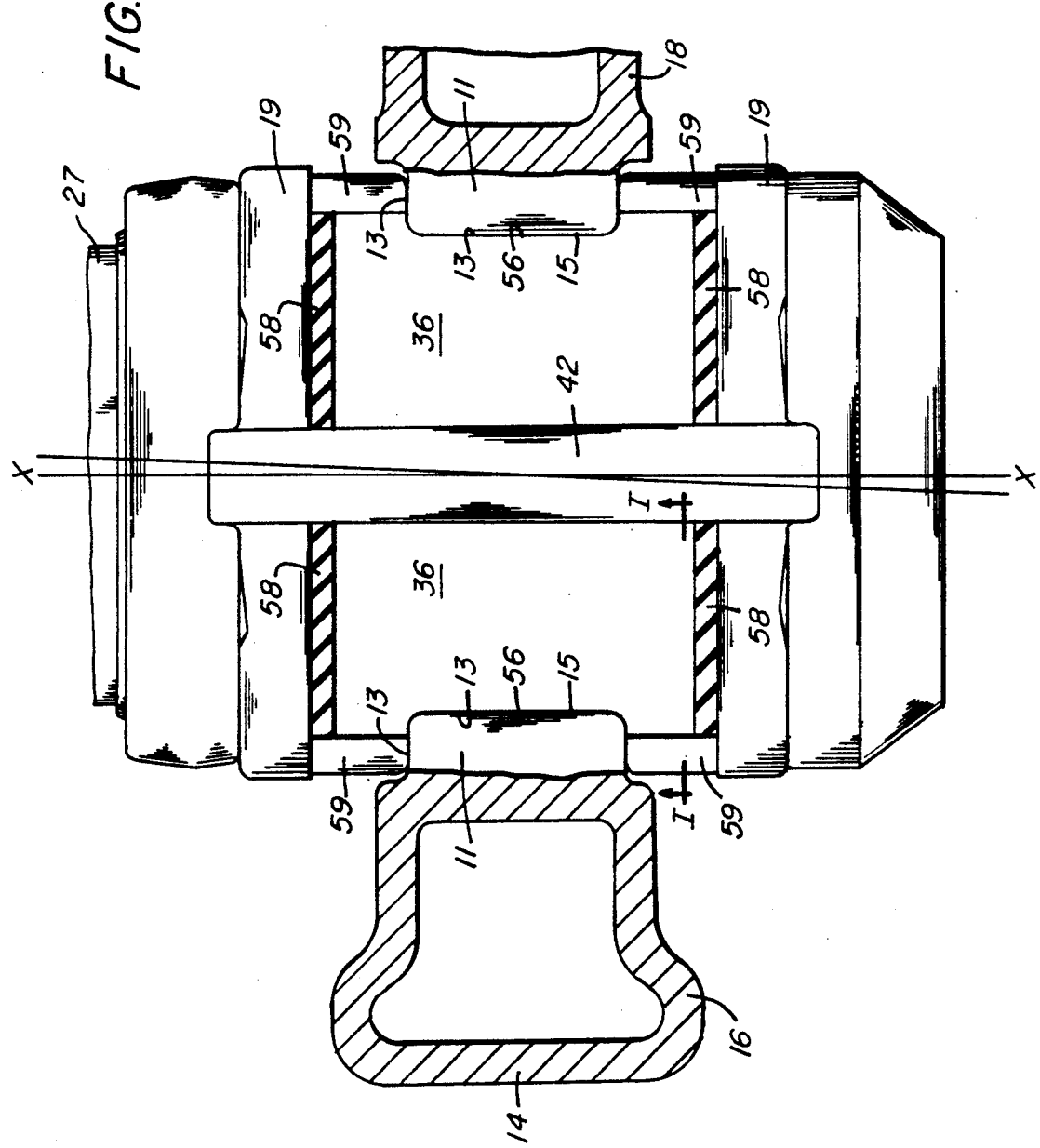
FIG. 2 is a sectioned top plan view taken on line II—II of FIG. 1.

Each pedestal opening 12 is defined by longitudinally spaced, downwardly projecting pedestal jaw portions 16 and 18 of side frame 14, and an intervening roof portion 20 such that a bearing journal 22 of a conventional wheelset 24 may be received within pedestal opening 12 below roof portion 20. The bearing journal 22 comprises a roller bearing assembly 26 which provides a well known rotary interface between the wheelset axle 27 (FIG. 2) and a cylindrical bearing cup 28 which encompasses roller bearing assembly 26. As is well known, in operation the bearing cup 28 is non-rotatably engaged with a bearing adapter while the wheelset 24 is axially rotatable with respect to the rotationally stationary bearing cup and adapter.

For support of the side frame 14 with respect to the wheelset 24, bearing journal portion 22 of wheelset 24 is received within pedestal opening 12 with the bearing adapter assembly 10 captively retained in engagement with an upper external surface portion 30 of bearing cup 28 and with an adjacent downwardly facing surface portion 32 of pedestal roof 20 which preferably may extend substantially the full width and length of pedestal roof portion 20.

More specifically, bearing adapter assembly 10 preferably comprises a rigid bearing adapter member 34 of cast iron, for example, and an assembly of generally wedge-shaped elastomeric members 36 which are received in the assembled configuration into pedestal opening 12 as a conventional bearing adapter would be received with conventional longitudinally spaced thrust lugs 11 engaged within cooperably formed slots 13 (FIG. 2) disposed at the respective longitudinally opposed ends of the bearing adapter assembly 10.

Laterally spaced and upwardly projecting flange or side portions 19 of the adapter member 34 project above the elevation of pedestal opening roof surface 32 to overlap the opposed sides of the pedestal opening roof portion 20. The rigid adapter member 34 also includes a downwardly facing, generally cylindrical surface portion 38 which is engageable with the complementary upper surface portion 30 of bearing cup 28 for support of the bearing adapter assembly 10 with respect to the wheelset 24.

The exterior periphery of adapter member 34 includes an upper surface 40 which extends intermediate flanges 19 and includes a centrally located, transversely extending ridge 42 (FIGS. 1 and 2) that extends generally parallel to the rotary axis X—X of wheelset 24. Engagement surface 40 includes surface portions 44 which extend laterally with respect to the pedestal opening in confronting relation to surface 32. Surface portions 44 also slope downwardly in opposed longitudinal directions from ridge 42 so as to diverge downwardly from pedestal roof surface 32. Adjacent the longitudinally outer end of each surface portion 44 is a vertically downward step 46, and from the lower end of each step 46 a further surface portion 44' slopes longitudinally downwardly and outwardly, and then extends generally horizontally in the longitudinally outward direction to a point 48 adjacent respective pedestal jaw inner surfaces 51. From point 48 a further surface portion 49 of the exterior periphery of the rigid member 34 extends generally downwardly adjacent pedestal jaw inner surfaces 51 and is joined with surface 38 by a lowermost, generally radiused surface portion 39.

The inner surface configuration of pedestal opening 12 may be essentially conventional as the invention is intended preferably as a retrofit for conventional three piece trucks. Accordingly, the various pedestal opening inner surfaces including surfaces 32 and 51 are not described in detail here as those versed in the art will be fully familiar with conventional pedestal opening configurations and such detailed description thus is deemed unnecessary. It will suffice to note that the support surfaces of the pedestal opening 12 cooperate with the above described exterior surface portions of adapter member 34 to define an envelope within which the elastomeric elements 36 are received.

Accordingly, each elastomeric element 36 comprises a generally wedge-shaped member having diverging upper and lower surface portions 50 and 52 which are formed so as to be engageable with surfaces 32 and 44, respectively. Each elastomeric element 36 is further provided with a step portion 54 which conforms with respective step 46 and a vertical surface portion 56 which is provided as a portion of the throat of slot 13 to be engageable with a confronting surface 15 of thrust lug 11 in each of pedestal jaws 16 and 18. From FIGS. 2 and 4, the elastomeric elements 36 will also be seen to include a pair of laterally spaced apart, upstanding flange portions 58 which are confined laterally between the lower part of pedestal roof portion 20 (which is upwardly adjacent to surface 32) and the respective upwardly projecting flanges 19 of adapter member 34.

In addition, laterally spaced side column portions 59 of elastomeric members 36 extend longitudinally outward beyond the respective surfaces 56 and are confined between the opposed lateral sides 13 of the thrust lugs 11, respectively, and the respective adjacent portions of the laterally spaced adapter member flange portions 19. The side column portions 59 also engage surfaces 44' such that when vertical loading is applied to elastomeric elements 36, the side column portions 59 deform laterally to laterally confine the members 36 with respect to thrust lugs 11. The side frame pedestal thus is elastically confined with respect to the wheelset bearing assembly with sufficient elastic restraint, both initially and throughout bearing adapter service life, to limit both lateral and longitudinal side frame pedestal-to-bearing journal freedom.

The following further description comprises not only structural description but in addition disclosure of the mode of operation and the method of my invention, described with reference to FIGS. 1 through 4 inclusive. As has been noted, the instant invention serves to control the freedom of relative longitudinal and lateral side frame-to-bearing journal motion thus enhancing empty car lateral stability at higher speeds; however, the increased lateral and longitudinal pedestal to bearing journal restraint also accommodates loaded car wheelset steering freedom.

The disclosed elastic pedestal journal restraints additionally improve the roller bearing journal load environment by offering improved symmetry of bearing loading. They also preclude extreme journal impacts that occur in conventional side frame journal assemblies which permit relatively free lateral and longitudinal relative motion between rigid limits. The invention still further provides continuous wear compensation whereas in conventional trucks, the magnitude of impact loads becomes increasingly more severe as side frame to adapter lateral and longitudinal rigid limits wear in service.

To provide wear compensation, the wedge-shaped elastomeric members 36 are retained intermediate the rigid adapter member 34 and the pedestal roof surface 32 such that under the loading and deformation thereof in service they tend to continuously migrate down the slope of surfaces 44 and longitudinally outward into engagement with the opposed thrust lugs 11. Fit-up and proper confinement thus is maintained throughout the service life of the bearing adapter 10, and both lateral and longitudinal elastic restraint are maintained throughout the service life of the bearing adapter assembly.

The invention also provides the requisite wheelset freedom to permit the loaded car wheelsets to steer around track curves or to independently seek optimum tracking alignment on tangent track. The weight of the car, bolster and side frames loads surfaces 50 of the respective elastomeric elements 36 in vertical compression. Due to the described wedge-like geometry of the elastomeric elements 36, the vertical unit pressure supporting the weight of the car between the mutually engaged pedestal roof 32 and surface 50 of the respective elastomeric wedges is greatest along the thinner section portions of the elastomeric elements 36 because of the higher unit compression strain in the thinner elastomeric sections. Thus, the greatest vertical unit pressure on elastomeric members 36 occurs adjacent the central ridge 42 of the adapter member 34, and decreases with progressively greater longitudinal distance from ridge 42 with increasing section thickness of the elements 36. As will be seen from the disclosure, this provides an optimized resisting moment for rotation of adapter member 34. The larger portion of the mass of elastomer concentrated at longitudinally outer locations, with the particular geometry of this larger mass as described, is also effective to restrain longitudinal translation of the wheelsets by longitudinally oriented compressive deformation of the elastomer in regions longitudinally and laterally adjacent to the side frame pedestal jaw thrust lugs.

Figure 3:
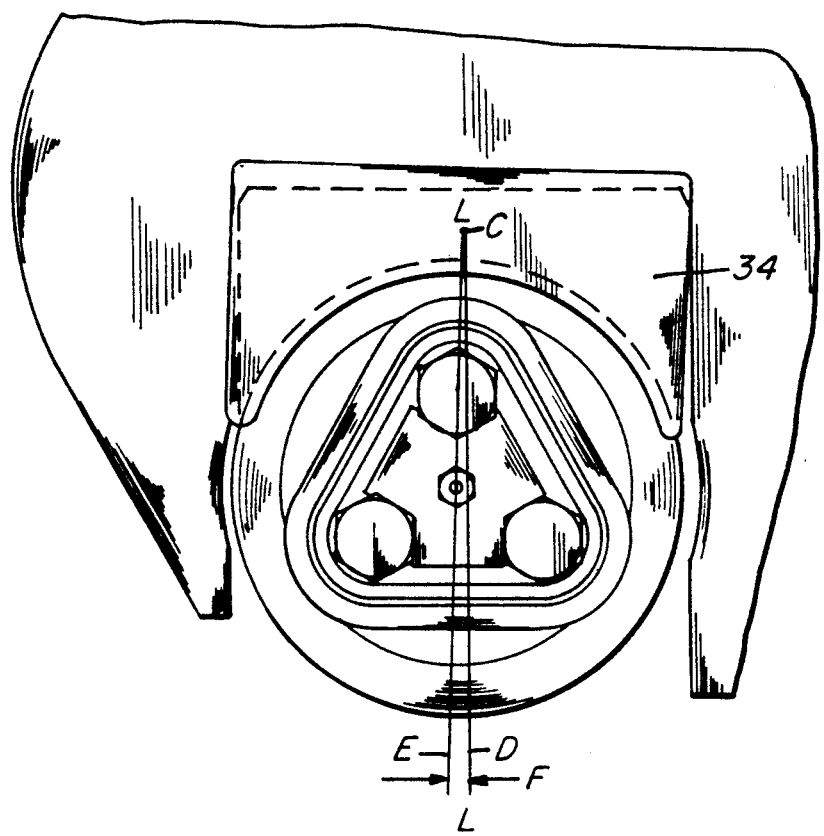
FIG. 3 is a generally schematic side elevation similar to FIG. 1 and showing longitudinal wheelset movement with respect to a side frame.

Steering load imposed by the wheelsets 24 on the bearing adapters 10 deform the elastomeric elements 36 differentially so that the rigid adapter member 34 can rotate about a center point C located on line L—L (FIG. 3). Such adapter rotation occurs in response to various force inputs, including most notably the rail-wheel steering forces experienced as the wheelsets 24 tend to yaw with respect to the side to the side frames 14 in negotiation of both tangent and curved track above described. That is, on curved track the wheelsets will tend to yaw independently toward their respective true radial positions as influenced by the wheel conics and the wheel-rail friction forces, and on tangent track the wheelsets will yaw with respect to the side frames as they follow the above-described sinusoidal path. Such steering forces result in longitudinal translation or fore and aft motion of the wheelset bearing journals with respect to the pedestal openings, which motion is accommodated by rotation of the bearing adapter member 34 as shown in FIG. 3 about center C from its neutral position on a radial D (which extends vertically from center C) to a radial E displaced angularly from the radial D by an angle F.

The elevation of the center of rotation C along line L—L is determined by the relative stiffness of the elastomeric elements 36 in longitudinal shear and in differential compression. The lower the magnitude of shear stiffness of the elastomer, the higher along line L—L' the center of rotation C will fall, tending toward the behavior of predominantly shear restrained pedestal freedom of conventional steering trucks.

The instant invention can thus employ a higher shear resistant material for enhanced lateral and longitudinal journal control and resultant improved lateral empty car stability. Additionally, rotational freedom as above described can now also be achieved with proper elastomeric element geometry to permit sufficient longitudinal motion of the bearing journals within the pedestal jaw openings for response to available loaded car steering force levels.

Variations in the design of elastomeric elements 36 are contemplated to optimize the performance of adapter 10 in both loaded and empty car operation. For example, with a given elastomeric element design and material, if the wedge angle of the elastomeric elements is made larger than the included angle between the adapter sloping surface 44 and the pedestal roof surface 32, the resisting moment to rotation of the adapter member 34 about center C would be increased. Also, due to a resulting higher vertical elastomer unit stress near thrust lugs 11, the confinement for lateral and longitudinal translation of member 34 in the pedestal opening 12 would also increase.

An optimal design of elastomeric elements 36 might well include a composite member having a harder and more durable elastomer at the pedestal roof interface and a lower hardness elastomer comprising the remainder of the elastomeric element 36. Such a combination would yield improved wear resistance at the pedestal roof interface without reducing the vertical resilience needed for loaded car steering.

Figure 4:
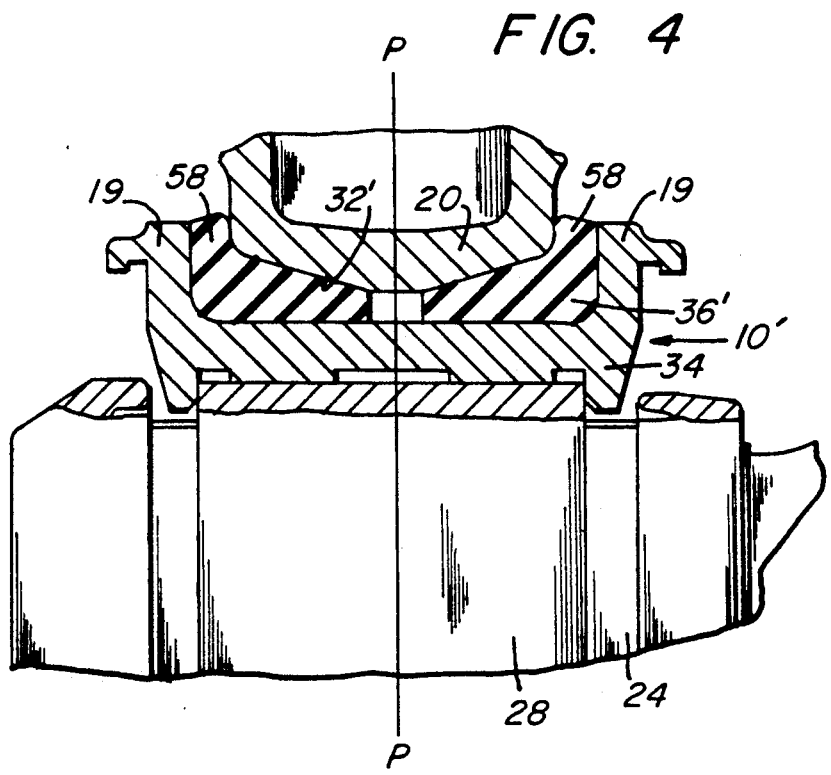
FIG. 4 is a transverse section taken generally at the location of line IV—IV of FIG. 1 and showing an alternative embodiment of the invention.

FIG. 4 illustrates a bearing adapter assembly 10' similiar in many salient respects to the assembly 10 as above described and including pairs of laterally opposed elastomeric elements 36', each of which has opposed, generally horizontal lower and upper surface portions which cooperably engage rigid adapter member 34 and a downwardly facing engagement surface 32' of pedestal roof portion 20, respectively. Surface 32' diverges laterally upward and outward from the central vertical plane P—P of the side frame such that the gravitational preload on members 36' tends to bias members 36' laterally outward while also effecting confinement thereof by longitudinal wedging action as above described. This bi-directional (lateral and longitudinal) wedging action will provide alternative modes of confinement, restraint, and wear compensation over the embodiment of FIGS. 1-3, and thus affords opportunities to design for optimal levels of both lateral and longitudinal elastic restraint.

According to the description hereinabove, the instant invention provides a novel and improved apparatus and method for maintaining and stabilizing the relative motion between railway truck wheelsets and the components supported thereby, particularly as regards the wheelset steering responses which have a tendency in conventional cars to encourage empty car harmonic oscillations.

Of course, the above description pertains only to certain presently preferred best mode embodiments of the invention. I have contemplated various alternative and modified embodiments which would also occur to others versed in the art, once apprised of my invention. For example, the elastomeric elements I have described may be reinforced in various ways to modify the modes and magnitude of elastic response and restraint provided thereby. Mechanical reinforcement is but one of many design alternatives that are contemplated for optimizing lateral and longitudinal elastic restraint in the context of the invention as described. Accordingly, it is intended that the invention be construed as broadly as permitted by the scope of the claims appended thereto.

I claim:

1. A bearing adapter assembly adapted for engagement within a pedestal opening of a railway truck side frame for supporting such a railway truck side frame with respect to a railway truck wheelset bearing comprising:

a rigid adapter means adapted to be supported with respect to such a wheelset bearing in a manner to accommodate axial rotation of such a wheelset with respect to said rigid adapter means;

said rigid adapter means being further adapted to be received within such a pedestal opening with outer surface portions thereof disposed in spaced relationship with respect to given inner surface portions of such a pedestal opening;

resiliently deformable elastomeric means engageable with said outer surface portions and adapted to engage such given inner surface portions for support of such a side frame with respect to said rigid adapter means; and said elastomeric means being resiliently deformable under loads borne thereby while supporting such a side frame in a manner to exert between said rigid adapter means such a side frame both laterally and longitudinally directed confining forces of sufficient magnitude to restrain lateral and longitudinal movement of said rigid adapter means with respect to such a pedestal opening in operation; and said elastomeric means being further resiliently deformable in a manner to permit said rigid adapter means to rotate with respect to such a pedestal opening about an axis of rotation extending generally axially of such a wheelset.

2. The bearing adapter assembly as set forth in claim 1 wherein each said elastomeric means comprises at least a pair of longitudinally opposed elastomeric elements and said outer surface portions include surfaces engageable, respectively, with said opposed elastomeric elements in supporting such a side frame are effective to urge said opposed elastomeric elements longitudinally outward, respectively, in opposed longitudinal directions with respect to said rigid adapter means.

3. The bearing adapter assembly as set forth in claim 1 wherein said further resilient deformation of said elastomeric means is principally vertical compressive deformation thereof.

4. The bearing adapter assembly as set forth in claim 3 wherein said vertical compressive deformation varies over the longitudinal extent of said elastomeric means.

5. The bearing adapter assembly as set forth in claim 1 wherein said elastomeric means includes surface portions adapted to engage such given inner surface portions to transmit longitudinally directed thrust loads between said rigid adapter means and such a side frame.

6. The bearing adapter assembly as set forth in claim 1 wherein said elastomeric means includes an elastomeric body portion having a generally wedge-like geometry which is effective under the loads imposed on said elastomeric means in supporting such a side frame to move said elastomeric means longitudinally outward with respect to said rigid adapter means.

7. The bearing adapter assembly as set forth in claim 6 wherein said wedge-like geometry is additionally effective under the loads imposed on said elastomeric means in supporting such a side frame to move said elastomeric means laterally outward with respect to said rigid adapter means.

8. The bearing adapter assembly as set forth in claim 7 wherein said elastomeric means includes a plurality of elastomeric bodies disposed in laterally opposed relation with respect to said rigid adapter means.

9. The bearing adapter assembly as set forth in claim 8 wherein said plurality of elastomeric bodies includes elastomeric bodies disposed in laterally opposed relation with respect to said rigid adapter means.

10. In a railway truck, the structure for supporting a side frame with respect to a wheelset bearing comprising:

a pedestal portion of such a side frame;

said pedestal portion having a pedestal opening which includes a downwardly facing inner roof surface and longitudinally spaced inner pedestal jaw surfaces;

a bearing adapter assembly engageable within said pedestal opening;

said bearing adapter assembly including a rigid adapter means adapted to be supported by such a bearing in a manner to accommodate axial rotation of such a wheelset with respect to said rigid adapter means;

said rigid adapter means being received within said pedestal opening with outer surface portions thereof disposed in spaced relationship with respect to said surfaces of said pedestal opening;

resiliently deformable elastomeric means received intermediate said outer and inner surfaces and engageable therewith in load bearing engagement; and said out and inner surfaces being disposed with respect to each other when said elastomeric means is engaged therebetween such that said elastomeric means is resiliently deformable under generally vertically directed compressive loading in a manner to exert between said rigid adapter means and said pedestal portion laterally and longitudinally directed confining forces of sufficient magnitude to restrain lateral and longitudinal movement of said rigid adapter means with respect to said pedestal portion in operation, and said elastomeric means being further resiliently deformable in a manner to permit said rigid adapter means to rotate with respect to said pedestal portion about an axis of rotation extending generally axially to such a wheelset.

11. The structure for supporting a side frame as set forth in claim 10 wherein said elastomeric means is of a geometry, relative to the geometry of said outer and inner surfaces, such that vertically directed compressive loading initially deforms said elastomeric means in differential compressive deformation with the maximum percent compressive deformation occurring adjacent the longitudinally innermost portions of said elastomeric means.

12. The structure for supporting a side frame as set forth in claim 11 wherein said differential compressive deformation decreases from said maximum percent compressive deformation to a minimum percent compressive deformation longitudinally outward of said longitudinally innermost portions.

13. A bearing adapter assembly adapted for engagement within a pedestal opening of a railway truck side frame for supporting such a railway truck side frame with respect to a bearing of a railway truck wheelset comprising:

a rigid adapter means having outer surface portions;

said rigid adapter means being adapted to be supported by such a bearing and to be received within such a pedestal opening with said outer surface portions disposed in spaced relationship with respect to given surface portions of the roof and longitudinally spaced jaws of such a pedestal opening;

said outer surface portions being of a form, with respect to such given inner surface portions, to define therebetween a space for receiving a resiliently deformable means;

resiliently deformable elastomeric means received within said space in engagement with said outer surface portions and adapted to engage such inner surface portions in a load bearing engagement; and said space being of a form, and said elastomeric means being of a complementary form, that said elastomeric means is resiliently deformable under loads borne thereby in supporting such a side frame in a manner to exert between said rigid adapter means and such a side frame laterally and longitudinally directed confining forces of sufficient magnitude to restrain lateral and longitudinal movement of said rigid adapter means with respect to such a pedestal opening in operation, and said elastomeric means being further resiliently deformable in a manner to permit said rigid adapter means to rotate with respect to such a pedestal opening about an axis of rotation extending generally axially of such a wheelset.

14. The method of controlling relative longitudinal movement of a pair of railway truck wheelsets each having opposed bearing journal end portions which are confined within respective pedestal openings of a pair of railway truck side frames intermediate respective pairs of longitudinally opposed inner surfaces of the side frame pedestal jaws comprising the steps of:
confining each said bearing journal end portion intermediate a respective pair of said opposed inner surfaces in a manner to permit said bearing journal end portions to move longitudinally with respect to the respective side frame pedestal jaws; and
restraining said bearing journal end portions to move longitudinally with respect to said side frame pedestal jaws, respectively substantially only in conjunction with simultaneous orbital movement of said bearing journal end portions about respective centers disposed vertically above the longitudinal axes of said wheelsets, respectively.

15. The method as set forth in claim 14 wherein said centers are located vertically intermediate said longitudinal axes of said wheelsets, respectively, and respective inner downwardly facing roof surfaces of the respective said pedestal openings.

16. The method as set forth in claim 14 wherein said confining step includes providing resiliently deformable elastomeric means in a state of compressive deformation to support said side frames with respect to said bearing journal end portions, respectively.

17. The method as set forth in claim 16 including the additional step of continuously urging said elastomeric means longitudinally outward into engagement with said longitudinally opposed inner surfaces, respectively, in response to loads borne by said elastomeric means in supporting said side frames with respect to said bearing journal end portions.

18. A bearing adapter assembly adapted for engagement within a pedestal opening of a railway truck side frame for supporting such a railway truck side frame with respect to a railway truck wheelset bearing journal comprising:
a rigid adapter means adapted to be supported with respect to such a wheelset bearing journal in a manner to accommodate axial rotation of such a wheelset with respect to said rigid adapter means;
said rigid adapter means being further adapted to be received within such a pedestal opening with outer surface portions thereof disposed in spaced relationship with respect to given inner surface portions of such a pedestal opening;
resiliently deformable elastomeric means engageable with said outer surface portions and adapted to engage such given inner surface portions to support such a side frame with respect to said rigid adapter means; and
said elastomeric means being resiliently deformable under loads borne thereby while supporting such a side frame with respect to said rigid adapter means and being of a form that the resilient deformation thereof under such loads is effective to restrain such a bearing journal with respect to the respective pedestal opening in a manner permitting relative longitudinal movement therebetween substantially only in conjunction with simultaneous orbital movement of the respective bearing journal about a center located vertically above the longitudinal axis of the respective wheelset.

19. The bearing adapter assembly as set forth in claim 18 wherein said elastomeric means is additionally resiliently deformable under loads borne thereby while supporting such a side frame with respect to said rigid adapter means in a manner to laterally confine such a bearing journal with respect to the respective pedestal opening.

20. The bearing adapter assembly as set forth in claim 18 wherein said resilient deformation is principally compressive deformation.

21. The bearing adapter assembly as set forth in claim 20 wherein said resilient deformation is principally vertical compressive deformation.

22. The bearing adapter assembly as set forth in claim 21 wherein said vertical compressive deformation varies over the longitudinal extent of said elastomeric means.

23. The bearing adapter assembly as set forth in claim 18 wherein said elastomeric means includes surface portions adapted to engage such given inner surface portions in a manner to transmit longitudinally directed thrust loads between said rigid adapter means and such a side frame.

24. The bearing adapter assembly as set forth in claim 18 wherein said elastomeric means comprises at least a pair of adjacent elastomeric elements each being of a form that the loads borne by said elastomeric elements while supporting such a side frame with respect to rigid adapter means are effective to urge said opposed elastomeric elements outwardly in opposed directions with respect to each other.

25. The bearing adapter assembly as set forth in claim 24 wherein said adjacent elastomeric elements are disposed in longitudinally adjacent relation with respect to the longitudinal extent of said rigid adapter means and said loads are effective to urge said elastomeric elements outwardly in longitudinally opposed directions with respect to each other.

26. The bearing adapter assembly as set forth in claim 25 additionally including another pair of adjacent elastomeric elements each disposed in laterally adjacent relation with one of said elastomeric elements of said first mentioned pair to form pairs of laterally adjacent elastomeric elements and said loads are further effective to urge said pairs of laterally adjacent elastomeric elements outwardly in laterally opposed directions with respect to each other.

27. The bearing adapter assembly as set forth in claim 26 wherein each said elastomeric element has a generally wedge-like form and each is disposed with respect to said rigid adapter means such that the vertical section thickness of each said elastomeric element increases with increasing distance from the others of said elastomeric elements adjacent thereto.

* * * * *